Oct. 24, 1939.  J. F. EGENOLF  2,177,019
DEVICE FOR TESTING CANS FOR DEFECTS
Filed Jan. 28, 1936  6 Sheets-Sheet 1
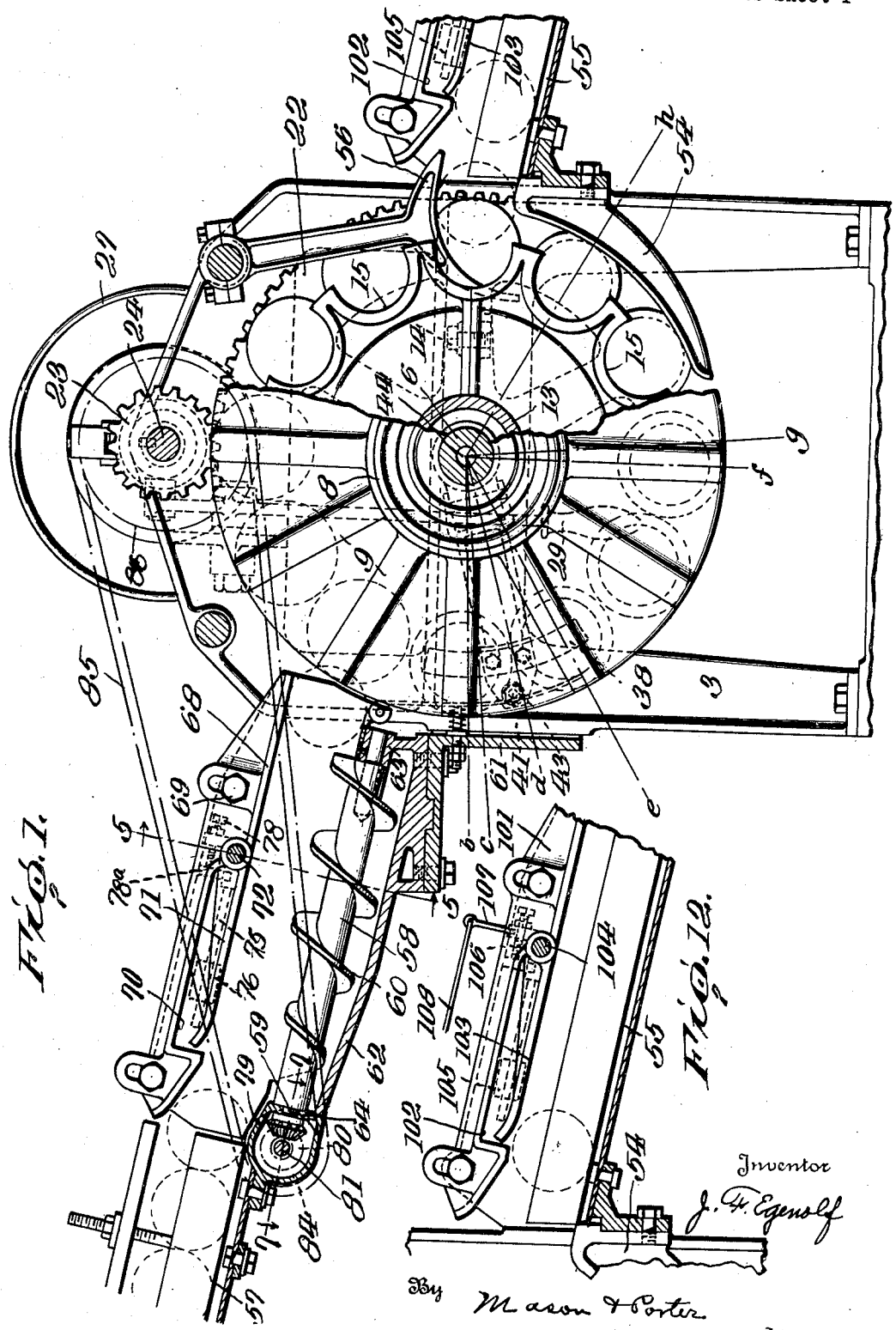
Inventor
J. F. Egenolf
By Mason & Porter
Attorneys

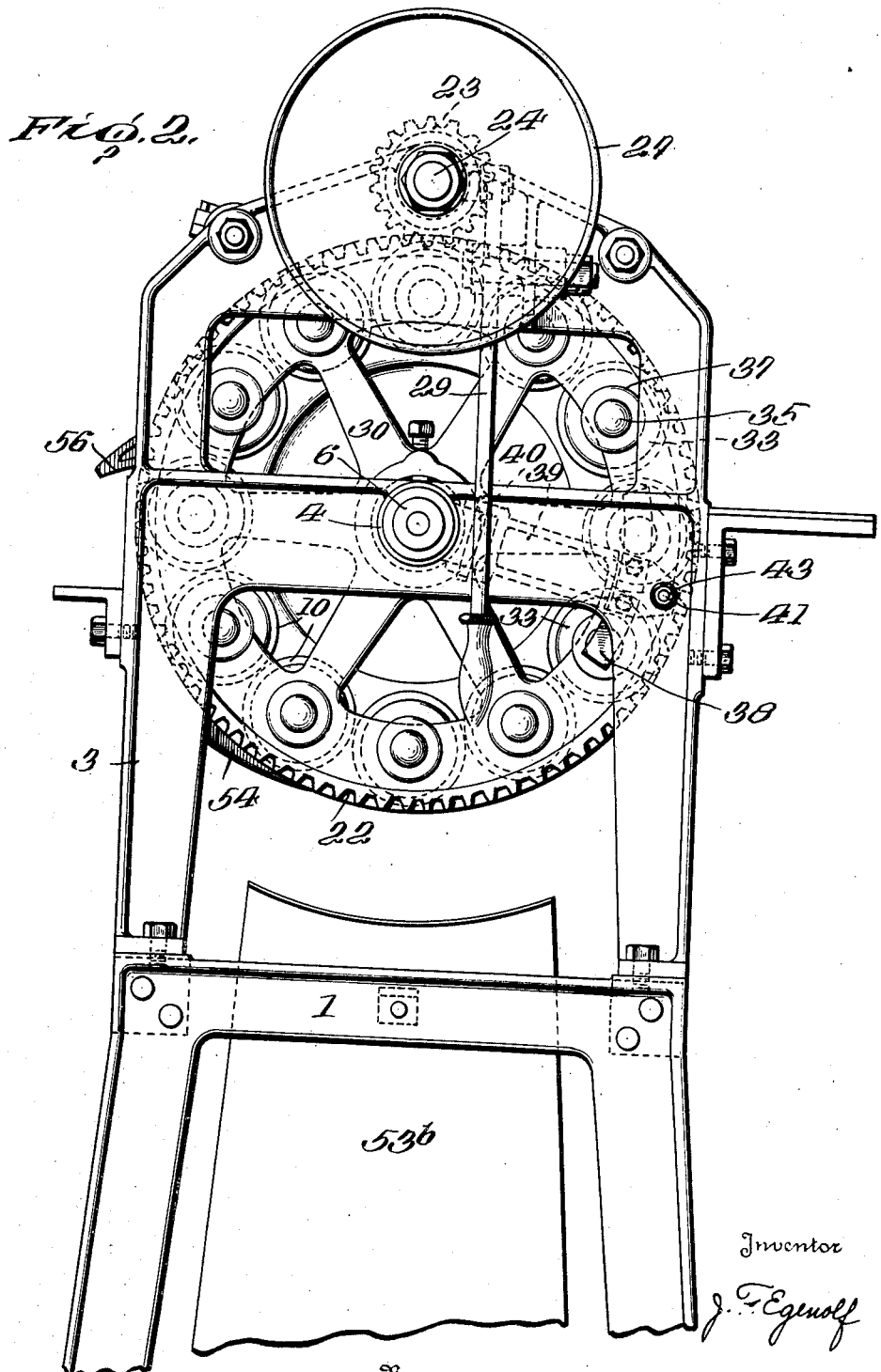

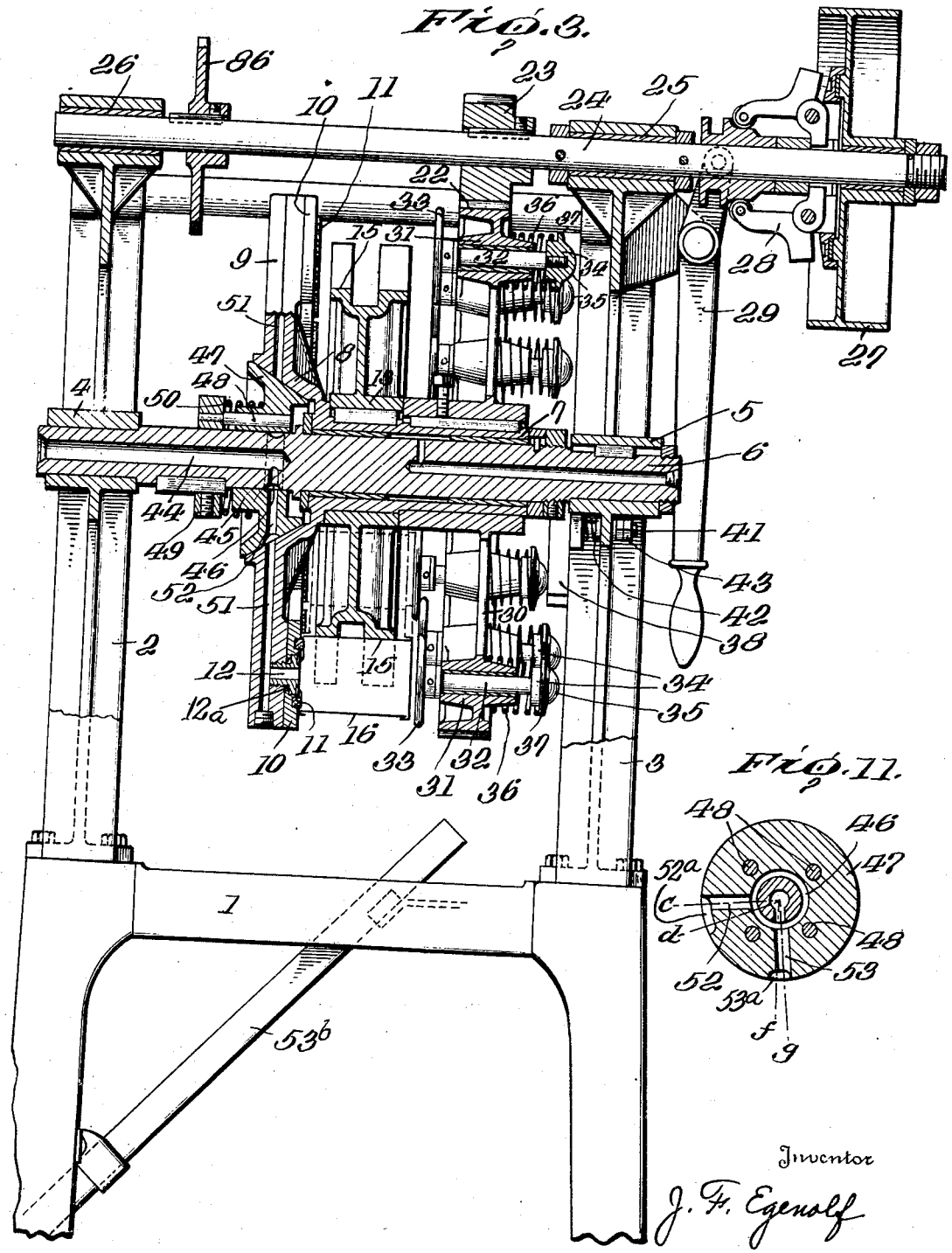

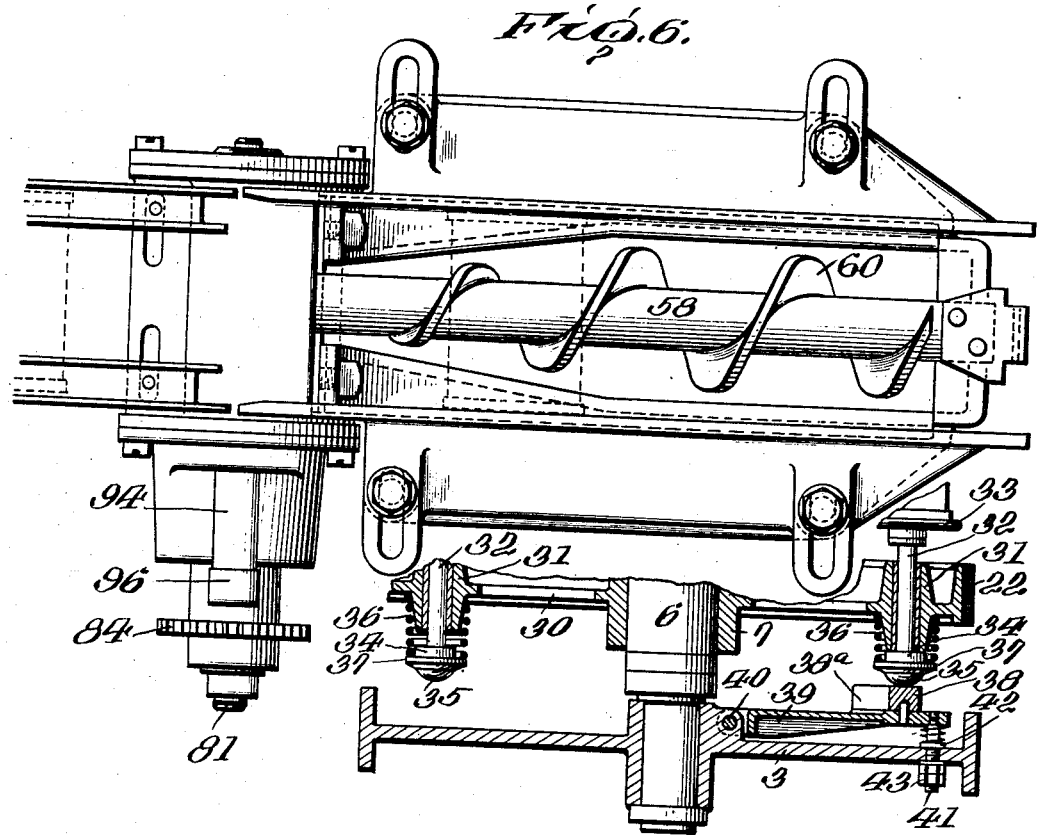
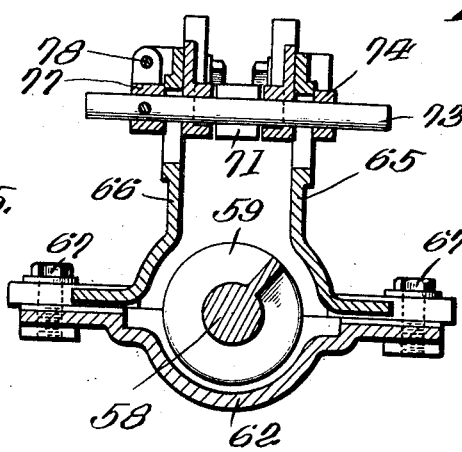

Oct. 24, 1939.　　　　J. F. EGENOLF　　　　2,177,019
DEVICE FOR TESTING CANS FOR DEFECTS
Filed Jan. 28, 1936　　　　6 Sheets-Sheet 5
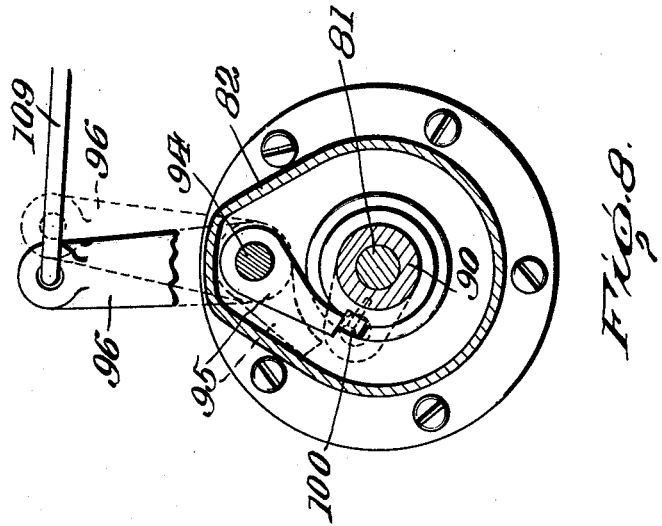
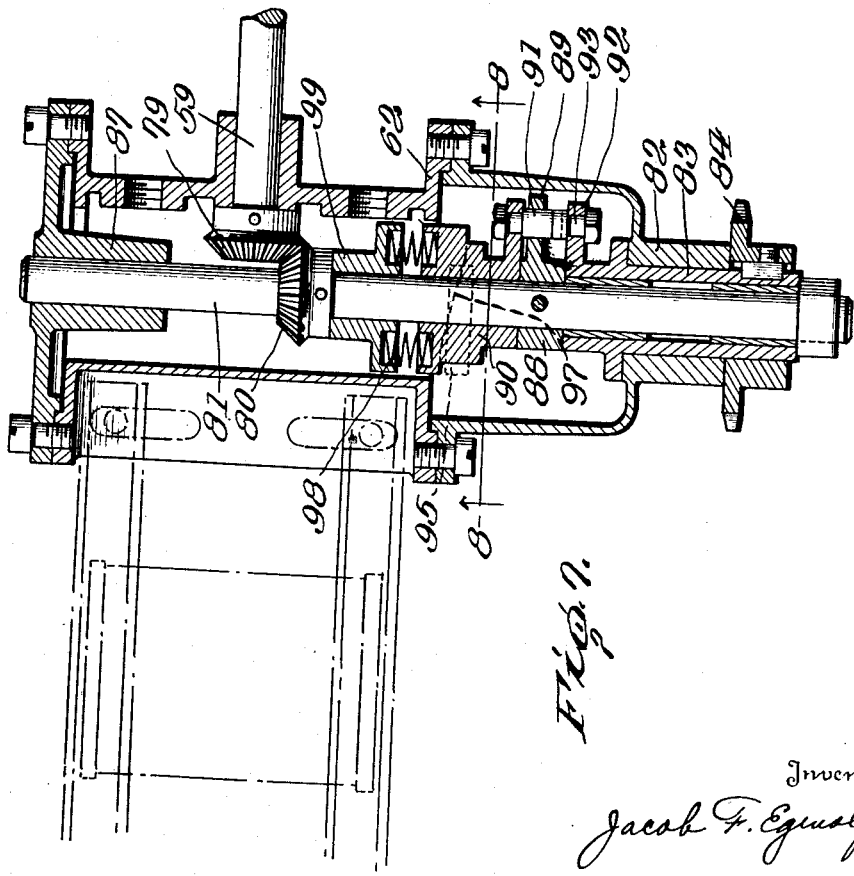
Inventor
Jacob F. Egenolf
By Mason & Porter
Attorneys Oct. 24, 1939.  J. F. EGENOLF  2,177,019
DEVICE FOR TESTING CANS FOR DEFECTS
Filed Jan. 28, 1936  6 Sheets-Sheet 6

Inventor
Jacob F. Egenolf
By Mason & Porter
Attorneys

Patented Oct. 24, 1939

2,177,019

UNITED STATES PATENT OFFICE 2,177,019

DEVICE FOR TESTING CANS FOR DEFECTS

Jacob F. Egenolf, San Francisco, Calif., assignor to Continental Can Company, Inc., New York, N. Y., a corporation of New York Application January 28, 1936, Serial No. 61,230

1 Claim. (Cl. 73—51)

In one type of can being made commercially, a cylindrical can body is formed, and ends having flanges are placed on the can body and solder bonded thereto. The flanges are dimensioned relative to the body so as to form a frictional engagement with the can body when assembled thereon. It sometimes occurs that the metal is fractured or has pinholes therethrough, so that if the can is completed and soldered, it will be a leaky can. Then again, in the fabricating of the body and ends, there is such imperfection that it is not possible to produce a solder bond between the end and the body which is free from leaks.

An object of the invention is to provide a machine for testing cans for defects due to imperfections in the metal or in the fabrication of the metal prior to the solder bonding of the ends to the body.

A further object of the invention is to provide a machine of the above type which will automatically eject any can from the line wherein there is a fracture in the metal or wherein the fabrication is imperfect so that the resulting solder bonded can would leak.

These and other objects will in part be obvious and will in part be hereinafter more fully disclosed.

In the drawings—

Figure 1 is a view partly in side elevation and partly in section showing a testing machine embodying the improvements;

Fig. 2 is a view taken from the opposite side of the machine from that shown in Fig. 1;

Fig. 3 is a vertical sectional view centrally through the machine;

Fig. 4 is a detail in section showing the cam for operating the clamping pads;

Fig. 5 is a sectional view on the line 5—5 of Fig. 1;

Fig. 6 is a view in plan showing the means for timing and directing the cans into the testing turret, the top of the canway with the yielding section being omitted;

Fig. 7 is a sectional view on the line 7—7 of Fig. 1;

Fig. 8 is a sectional view on the line 8—8 of Fig. 7;

Fig. 11 is a sectional view through the valve disk in the region of the ports and also through the shaft supporting the same, and Fig. 12 is a detail sectional view through the chute which receives the cans from the testing machine, and showing the yielding guide which controls the operation of the timing screw.

Figure 9:
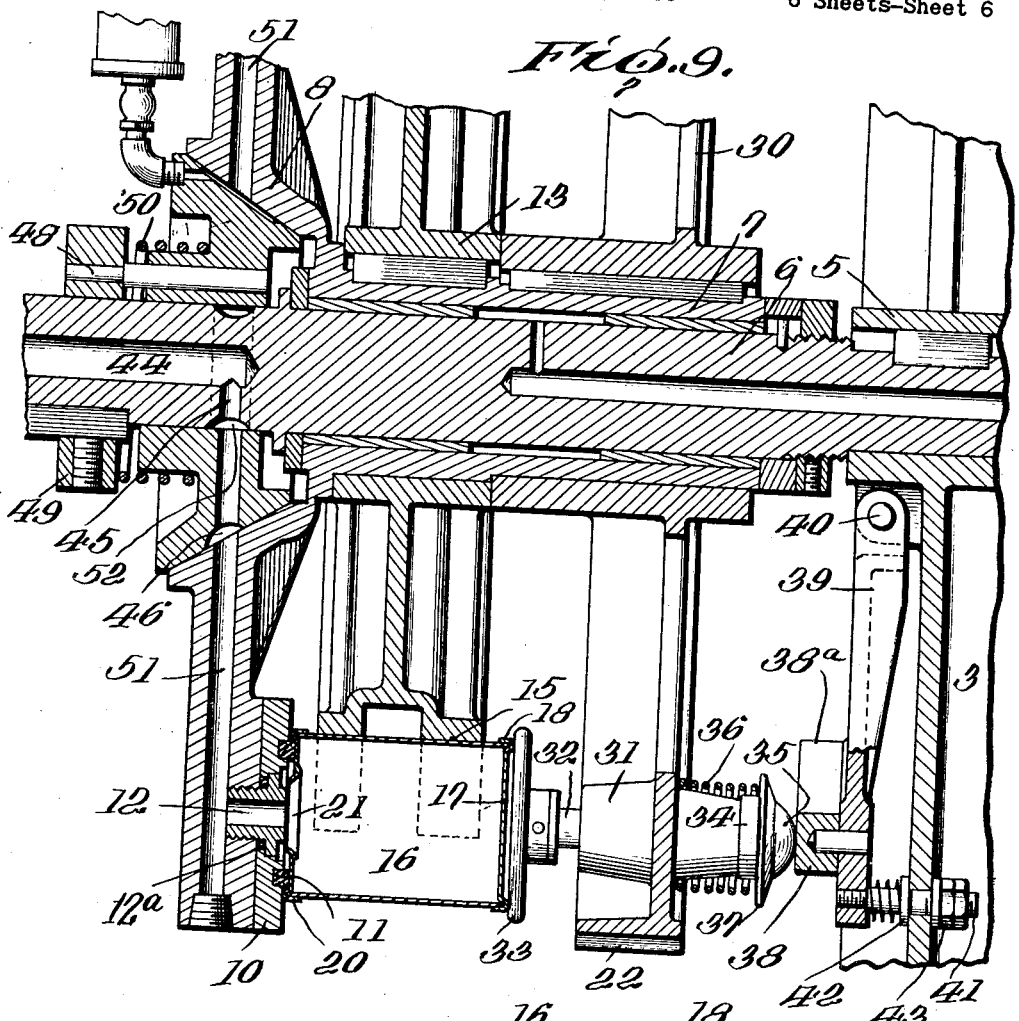
Fig. 9 is an enlarged sectional view through the testing machine showing the position of the turret and the associated parts after the can is closed and being placed under vacuum.

In the making of cans having the ends attached thereto by solder bonding, the cylindrical body is first completed, after which it is passed through a header in which ends are slipped on to the cylindrical body. One of these ends forms the closed bottom end of the can, and the other end has a filling opening therein through which the can is filled, and then the opening is closed. The ends are provided with flanges which engage over the can body, and these flanges are so sized that the ends make very tight frictional contact therewith so as to reduce the amount of solder necessary to solder the end to the can body. If the can body is dented or the flanges imperfectly formed, thus providing an abnormal space between the flange and the body, it is difficult to solder bond the end to the body. Furthermore, it sometimes occurs that the metal forming the body or the ends is fractured, or has a pinhole therethrough, so that if the ends are solder bonded to the body and the can completed, it will be a leaky can. The purpose of the present invention is to test the can after it leaves the header and to eject the can from the line before it passes into the crimper, if the metal is imperfect. It is found that the ends make sufficiently tight connection with the body as they leave the headers, so that in the normal can where the metal is free from fractures, the joints are nearly airtight and will retain vacuum for a definite period of time. This feature in the construction of the can preparatory to the soldering of the same is taken advantage of for the testing of the cans for imperfections. It is perferable to use a machine which is so constructed that the can may be placed under vacuum and sustained in the machine by the differential in atmospheric pressure against the can, so that in case of a defect causing the vacuum to drop instantly, the can will be released and ejected as an imperfect can. In the drawings there is shown a machine which may be used for testing cans in the carrying out of the invention.

The machine includes a supporting base 1 on which are mounted two spaced side frames 2 and 3. These side frames are provided, respectively, with bearings 4 and 5 in which is mounted a stationary shaft 6. Mounted for rotation on this shaft 6 is a sleeve 7. The sleeve has formed integral therewith a hub 8. Extending outwardly from this hub 8 is a series of radial arms 9. The hub is shown as provided with twelve arms. At the outer end of each arm is a can pad 10. This pad 10 is provided with a recess in which is placed a rubber sealing gasket 11. Centrally of the pad is a sleeve 12 which has a central opening therethrough. This sleeve serves as a means for connecting the pad to the arm, and against a gasket 12a.

Figure 10:
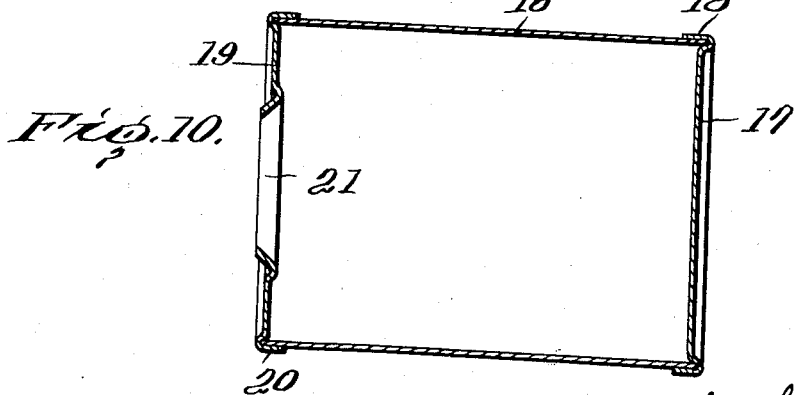
Fig. 10 is a sectional view through a can which is to be tested for leaks.

Adjacent the hub 8 is a turret 13 which is keyed to the sleeve 7. This turret is formed in two sections with a hub sleeve at the center which surrounds the sleeve 7, and the two sections are joined by clamping bolts, one of which is indicated at 14 (Fig. 1). The turret is provided with a series of can pockets 15. These can pockets are shaped to conform to the can body which is to be tested and are so positioned that when a can is placed in the pocket, the center line of the can will be opposite the center of the can pad 10. In Fig. 10 there is shown a can of the type above described. It includes a cylindrical body portion 16 to which a bottom end 17 is to be attached. This bottom end is provided with a flange 18 which is so dimensioned that when the end is placed on the cylindrical body, the flange will frictionally contact with the body producing a nearly tight connection between the end and the body which will retain a vacuum pull when the can is closed for a definite period of time. The solder bond is applied between the flange and the can body for securing the ends to the body. There is a top end 19 having a flange 20 which is likewise constructed and secured to the can body, and this end has an opening 21 which is the filling opening of the can. This type of end is usually referred to as a "snap-on" end as the flange makes tight contact with the can body so that just as little solder as possible is required to solder bond the seam.

The can bodies and the ends are assembled in the header in which the body is rounded up and the ends forced on to the body. The can bodies then pass into this testing machine and are placed in the can pockets 15, one after another, with the open end of the can adjacent the can pad 10. The can pads travel with the turret, and as the turret rotates, the cans are forced into engagement with the rubber sealing gasket and this produces a tight sealed connection between the pad and the can.

Also mounted on the sleeve 7 is a gear wheel 22. The gear wheel is keyed to the sleeve 7 and serves as a means for rotating the sleeve. Likewise, the turret 13 is keyed to this sleeve and rotates with the gear. The gear 22 meshes with a gear 23 fixed to a shaft 24 mounted for rotation in bearings 25 and 26 at the upper end of the side frames 2 and 3. Freely mounted on the shaft 24 is a belt wheel 27. A clutch mechanism 28 is provided for connecting the belt wheel to the shaft 24. This clutch is shifted by the hand lever 29. This provides a means for rotating the gear wheel, the turret and the can pads 10, together as a unit, maintaining the turret pockets in alinement with the can pads, as above described. The gear wheel 22 is provided with a ring portion 30 (see Fig. 2). The ring portion has laterally projecting bosses at spaced intervals which form bearing sleeves 31. Located in each bearing sleeve is a rod 32 and on the end of the rod is a clamping pad 33. The center of the rod 32 is in alinement with the center of the turret pocket and the center of the can pad 10. On the end of each rod 32 is a cap 34 having an outer rounded face 35. A spring 36 bears against a flange 37 on said cap and also against the sleeve 31, and normally holds the pad moved to the right, as viewed in Fig. 3, and as shown at the upper side of said figure. There are twelve of these can pads, and they are operated upon in turn by a stationary cam 38. As the turret and the gear wheel rotate, these caps come into contact one after another with the cam 38, and this cam is so shaped as to move the pad 33 into contact with the can in the can pocket and this forces the can against the rubber gasket 11, which closes the can, except for its connection to the port formed by the sleeve 12.

After the can is closed in the manner above described, it is subjected to a vacuum creating means for drawing a vacuum on the can. The cam 38 is yieldingly mounted (see Fig. 4). The end frame 3 carries an arm 39 which is pivoted as indicated at 40. The cam 38 is mounted on the arm. Secured to the outer end of the arm is a bolt 41 which passes through the end frame. A spring 42 between the arm and the end frame normally moves the arm toward the center of the machine. There are adjustable nuts 43 for limiting the inward movement of this arm. There is a slight variation in the height of cans, and this is taken care of by the yielding mounting of the cam 38. The spring, however, is of sufficient tension so as to force the cans against the rubber gaskets, very firmly sealing the can all the way around in its contact with the gasket. If the can is of oversize, the cam can yield to take care of such condition.

After the can is clamped against the traveling can pad, it is then placed under vacuum. This is accomplished by a connection to a vacuum creating means with which is associated a valve for momentarily connecting the can to the vacuum creating means. The shaft 6 is provided with a central recess 44. The pipe connects the outer end of the shaft to a suitable vacuum creating means. There is a radial port 45 leading from this central recess to an annular groove 46 which surrounds the shaft 6. The hub 8 is provided with a recess in which is placed a valve disk 47. The inner face of the hub 8 is inclined, and likewise the outer face of the valve disk is inclined, and these faces are ground to a running tight fit. The valve disk 47 is held from rotation by pins 48. These pins are connected to a collar 49 which is keyed to the stationary shaft. A spring 50 surrounding the hub on the valve disk bears against this collar 49 and this maintains the valve disk in contact with the hub 8.

Extending out through each arm 9 is a port 51 which is closed at its outer end and which makes connection with the recess through the sleeve 12. The valve disk 47 is provided with two radial ports, one of which is indicated at 52 (see Figs. 3 and 11) and the other of which is indicated at 53. The port 52 is connected with a recess 52a in the periphery of the valve disk 47 and the port 53 is connected with a recess 53a in the periphery of said valve disk. As the hub with its supporting arms rotates, the ports 51 will be brought, one after another, first into register with the recess 52a and then into register with the recess 53a. It will be noted from Fig. 1 that the cam 38 is so disposed that it operates to move the clamping pad 33 against the can and forces the can into sealed contact with the ring or gasket on the can pad while the turret is traveling between the radial lines b and c. The can is now completely closed, and while the turret is traveling between the radial lines c and d, the port 51 is in register with the recess 52a, and the can is subjected to a vacuum pull. At the line d, the port closes. The cap on the clamping pad leaves the cam 38 substantially at the radial line e, and this leaves the cans supported solely by the differential in pressure between the vacuum within the can and the air pressure bearing against the can and forcing the same against the gasket or ring 11. If the metal of the can is fractured or has a pinhole therein, air will pass into the can and relieve the vacuum, and as soon as the vacuum is released, then the differential in the pressure is removed and the can will fall by gravity from its connection with the pad. Then again, if there is a defect in the fabrication of the can, so that the flange, or the can body in the region of the flange on the end is bent, air will enter the can, overcoming the vacuum and the can will drop from the pad. The vacuum on the cans which are defective will drop to a degree which will release the can while the turret is turning through a predetermined distance, that is, in a given time so that the cans will be ejected from the line of travel and may be received in a basket or chute 53b beneath the turret. If the metal forming the can is free from fractures or pinholes and the can parts are properly fabricated, then the vacuum on the can, while it will decrease in degree, will hold the can supported on the pad so that it will not drop from the machine. When the can is passing from the radial line f to the radial line g, the port 51 is brought into alinement with the recess 53a, and the can is again momentarily subjected to the vacuum creating apparatus. This insures that the cans will enter within the guide 54. By the time radial line h is reached, air has leaked into the can displacing all vacuum and thus the can is released from its connection to the can pad 10. The can, however, will be retained in the can pocket until it is moved into alinement with the canway 55. A stripper guide 56 operates to forcibly strip the cans from the pockets so that they will pass by gravity into the canway 55 and along said canway.

The cans are received from the header through a canway 57 which includes supporting rails and guiding rails along which the cans pass by gravity. In order to time the cans into the turret pockets, a timing screw 58 is provided. This timing screw includes a central shaft 59 with a cam-shaped timing thread 60 secured thereto, and this thread is tapered and shaped so as to receive the cans and separate them one from another so that they may be discharged into the pockets of the turret as it passes the canway which feeds the cans into the turret. Fixed to the machine frame is a bracket 61. Mounted on said bracket 61 is a frame member 62 carrying a bearing 63 for the right-hand end of the shaft 59 and a bearing 64 for the other end of said shaft. Attached to the frame 62 are side frames 65 and 66. The cans passing between these side frames are received on the timing screw. The side frames 65 and 66 are adjustably mounted on the frame 62 by bolts 67 passing through suitable slots in the side frames, and this enables the canway to be adjusted for different sizes of cans. Located between these side frames 65 and 66 is a top frame 68 which is likewise adjustably secured by means of bolts 69 to the side frames. The top frame 68 is shaped so as to provide a recess 70 (see Fig. 1). A yielding guide 71 is pivoted at 72 and is adapted to bridge said recess so as to hold the cans in contact with the timing screw. This guide 71 is pivotally mounted on a rod 73. Attached to the rod 73 is a sleeve 74 carrying a rod 75 on which an adjustable weight 76 is mounted, and this weight tends to press the guide toward the traveling cans. There is also a sleeve 77 attached to the rod 73 which carries an adjustable stop screw 78 adapted to contact with a lug 78a and hold the guide in the position shown in Fig. 1. In case the can moves against the spiral thread on the timing screw, the guide 71 will yield so as to prevent a jam and will continue to press the can into its seat between the threads on the timing screw. This timing screw and the manner of timing the cans thereto is not new with applicant, and further disclosure thereof is not thought necessary. The timing screw holds the cans back and delivers them, one at a time, as the pockets pass the canway so as to receive a can.

The cans after they have been tested pass from the testing machine into the canway which conveys the cans into a crimping machine for the setting of the flange close in to the body preparatory to the applying of the solder for bonding the can end to the can body. It sometimes occurs that there are more cans passing through the tester than can be taken by the crimping machine, and therefore, it is desirable to control the cans which are fed into the testing machine by the cans accumulating in the canway after they leave the testing machine The canway receiving the cans from the testing machine is provided with a yielding guide, and this yielding guide, in case of a jam, will be forced out from the canway. This guide controls the timing screw. When a jam forces it out, it operates through suitable mechanism for unclutching the timing screw from the operating shaft therefor, and this mechanism will now be described.

The shaft 59 is provided with a bevel gear 79 which meshes with a bevel gear 80 on a cross shaft 81. Attached to the frame 62 is a bearing bracket 82. Mounted for rotation in this bearing bracket 82 is a sleeve shaft 83. The sleeve shaft 83 carries a sprocket wheel 84. A sprocket chain 85 runs over the sprocket wheel 86 fixed to the shaft 24 and over this sprocket wheel 84 on the sleeve shaft 83. Thus it is that the sleeve shaft is rotated continuously when the turret is rotated and in timing therewith.

The shaft 81 extends through the sleeve shaft 83 and has a bearing therein. It also turns in a bearing 87 carried by the frame 62. Fixed to the shaft 81 is a collar 88 carrying a projecting arm 89. The sleeve 90 is mounted on the shaft 81 at the inner side of this collar 88, and is provided with a dog or pin 91 which extends through this collar 88. The collar 88 is the driving member for the shaft 81. The sleeve shaft 83 is provided with a projecting arm 92 in which is mounted a dog or pin 93. When the parts are in the position shown in Fig. 7, then the dogs 91 and 93 come into contact and the sleeve shaft imparts rotations to the shaft 81.

Mounted in the bearing bracket 82 is a shaft 94 carrying a dog 95. This shaft 94 is provided with an arm 96 which is connected to this yielding guide in the canway at the discharge side of the testing machine. When there is a jam in the canway so that the guide is shifted outward, it will, through a suitable connecting mechanism, operate upon the arm 96 and this will move the dog 95 from the dotted line position to the full line position. When the dog is moved to the full line position, then the cam face 97 on the sleeve 90 contacts with the dog and this will force the sleeve 90 endwise on the shaft 81, so as to withdraw the dog or pin 91 from the path of rotation of the dog or pin 93. There are springs 98 between the sleeve section 99 and the sleeve 90 which force the sleeve 90 in the opposite direction along the shaft 81 when the dog is released, and this will cause the driving dog on the sleeve shaft 83 to again engage the driver and operate the shaft 81.

It is not only desirable to stop the timing screw and thus the delivery of cans to the testing machine when there is a jam in the discharge canway, but it is also desirable to stop this timing screw at a predetermined point in its rotation so as to hold the cans back away from the traveling turret, or otherwise there might be a jam. This is accomplished by means of a lug 100 carried by the sleeve 99 which moves against the end of the dog 95 so as to stop the timing screw at a predetermined point in its cycle of rotation. As soon as the jam is released, the yielding guide in the canway at the discharge side of the machine is returned to its normal position and this will release the dog 25.

The yielding guide which controls the timing screw is shown in Fig. 12. This guide is very similar to the guide shown in Fig. 1, as associated with the timing screw. At the upper side of the canway 55 into which the cans are discharged is a cover plate 101 provided with a recess 102. The controlling guide is indicated at 103. It is located in this recess and is pivoted at 104 to the cover plate. A weighted arm 105 normally presses the arm toward the cans, and a stop screw 106 limits the movement to the position shown in Fig. 12. If there is a jam in the canway 55, then the cans will be forced against this guide, forcing it to turn in a clockwise direction. The arm 107 is connected to a rod 108, and this rod through suitable mechanism (not shown) is in turn connected to the rod 109 that is attached to the arm 96. When the guide is turned in a clockwise direction, it will pull on the rod 108, and through said suitable mechanism, this will push on the rod 109 so as to throw the dog into position to stop the timing screw.

It is thought that the operation of the machine is obvious from the detail description given above.

The essential features of the machine reside in the devices which operate in succession on the cans for creating a vacuum within the cans in such a way that if the vacuum falls by reason of a leak due to imperfection in the metal, the can will be discharged as an imperfect can, while in those cans where the vacuum is sufficiently maintained, indicating there are no defects, the cans will pass along the can line into the machines for crimping and applying solder thereto.

It is obvious that many changes in the details of construction and the arrangement of the parts may be made without departing from the spirit of the invention as set forth in the appended claim.

Having thus described the invention, what I claim as new and desire to secure by Letters Patent, is:

A machine for testing cans, having snap-on ends, for defects prior to solder bonding the ends thereto, comprising a rotating turret having a plurality of can receiving pockets, a hub rotating with said turret and having a series of radially extending arms one for each pocket, a can supporting pad carried by each of said arms, a hollow sleeve for securing each pad to its arm, a rubber gasket surrounding each sleeve against which the end of the can may be placed with the filling opening of the can in alignment with said sleeve, a clamping means associated with each pad for forcing the can against said pad, a stationary shaft on which said turret and hub are mounted for rotation, said stationary shaft having a hollow portion, a valve disk supported by said shaft and held from rotation thereon, means for forcing the valve disk endwise on the shaft into tight running contact with the hub, a port in each arm connected to the hollow portion of the shaft and controlled by said valve disk, said valve disk having peripheral recesses therein and ports connecting said recesses to a vacuum creating means, said recesses being disposed so as to cause the cans when clamped against said pads to be momentarily connected to the vacuum creating means while clamped against said gasket, means for withdrawing the clamping means from the cans in succession whereby the cans are supported solely by the vacuum created thereon so that, if by reason of a defect in a can the vacuum drops below a predetermined degree in a given time, the can will drop from the turret pocket.

JACOB F. EGENOLF.